Feb. 17, 1931.    J. M. V. FICKLIN    1,792,687
CAMERA LEVEL INDICATOR
Filed Oct. 11, 1927
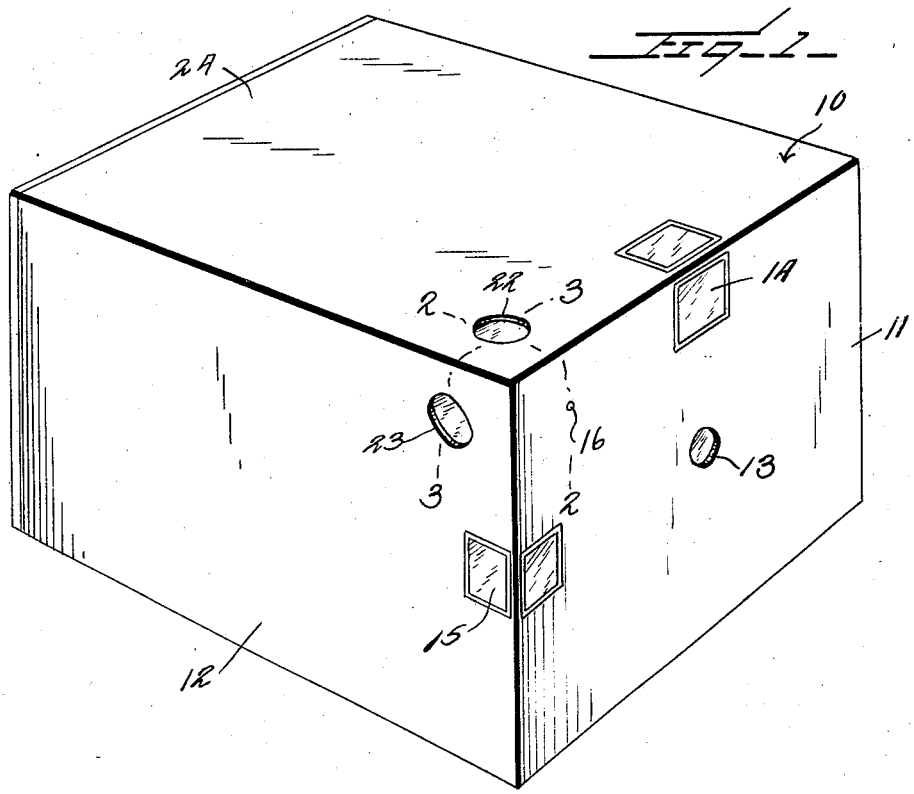
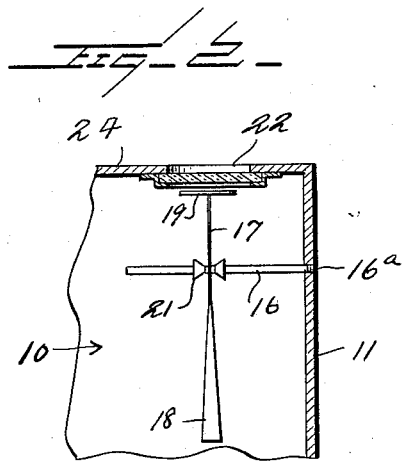
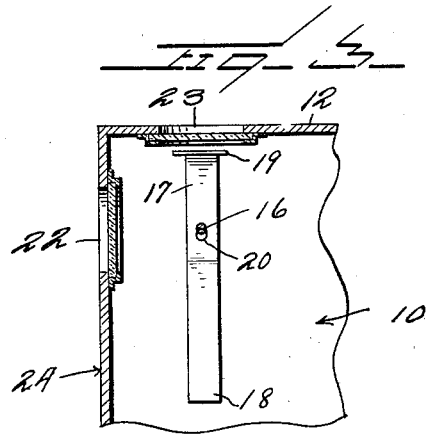
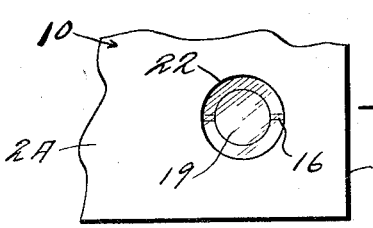
Inventor
J. M. V. Ficklin
By Watson E. Coleman
Attorney Patented Feb. 17, 1931

1,792,687

UNITED STATES PATENT OFFICE

JOHN M. V. FICKLIN, OF WASHINGTON, DISTRICT OF COLUMBIA

CAMERA-LEVEL INDICATOR

Application filed October 11, 1927. Serial No. 225,542.

This invention relates to cameras, and particularly to means for indicating whether the camera is level transversely or from front to rear.

One of the objects of the invention is to provide a very simple level indicating device which will indicate whether the upper wall of the camera is horizontal or not.

Another object is to provide a device of this character which is particularly applicable to box cameras.

My invention is illustrated in the accompanying drawing, wherein:—

Figure 1 is a perspective view of a camera having a leveling device applied thereto constructed in accordance with my invention;

Figure 2 is a section on the line 2—2 of Figure 1;

Figure 3 is a section on the line 3—3 of Figure 1, with the camera tilted so that the side 12 is uppermost;

Figure 4 is a top plan view of the corner of the camera looking down upon the display opening 22 and upon the head of the pendulum.

Referring to this drawing, 10 designates an ordinary box camera, though I do not wish to be limited to the use of my invention with a box camera. This box camera is provided with the usual front wall 11, side walls 12, and the usual exposure opening 13 normally closed by a shutter, and the usual finders 14 and 15. So far, I have described an ordinary type of box camera but, of course, do not wish to be limited to this use.

Extending through one wall of the camera, and preferably through the front wall thereof, is a rod or support 16 which may have one end screw-threaded, as at 16a, for engagement with the front wall. The rear end of this rod need not be supported but it will be obvious that it may be supported if found desirable. This rod may be attached to the camera in any suitable manner.

Swingingly mounted upon this rod is the pendulum 17, the lower end of which is weighted, as at 18, and the upper end of which is formed with a head 19, preferably circular in form and which may be of some shining material so as to be readily observable. The pendulum is formed with a somewhat elongated opening 20 through which the rod 16 passes, and disposed on each side of the pendulum in spaced relation thereto are the collars or shoulders 21, these being so spaced from the pendulum that the pendulum may swing in the plane of the rod 16 as well as swing in a plane at right angles to the rod 16. The upper wall 24 of the camera is formed with an opening 22 and the side wall of the camera with an opening 23.

If the camera be held with its longer axis horizontal, the head 19 of the pendulum will be concentric with and be observable through the opening 22. If the camera should be tilted from front to rear, the pendulum will rock upon the rod 16 in a plane approximately parallel to this rod. If the camera be tilted laterally the pendulum will swing upon the rod 16 as upon a center, and in either case the head of the pendulum will swing out from beneath the opening 22 or at least be displaced with relation to the center of this opening and this displacement will show that the camera is not being held horizontal, that is with its top wall in a horizontal position.

Exactly the same thing occurs where the camera is turned over so that its longer axis is vertical and the wall 12 is horizontal. In this case, the pendulum will swing around the rod 16 until the head is beneath the opening 23 and if the camera be held with the wall 12 in a horizontal position the head of the pendulum will show within the opening 23 and be concentric thereto.

It will be noted that the pendulum has a swinging motion parallel to the rod 16 or in a plane at right angles to the rod 16 or may swing in a plane less than a right angle to the rod 16 so that under all circumstances, unless the upper wall of the camera be held in a horizontal plane, the pendulum will be out of view or will be displaced laterally with relation to the opening 22 or 23 and thus the operator will see that his camera is not level and will shift the camera until the head 19 is displayed concentrically within the opening.

It is to be particularly noted that the pendulum swings freely and in a large arc in a plane at right angles to the shaft 17 so that the pendulum will swing quickly as the camera is turned to bring either of its walls uppermost but that the arc of movement of the pendulum from front to rear of the camera need be very slight and that, therefore, the pendulum is permitted to have only a relatively slight oscillation parallel to the shaft 17, the only necessity for a relatively long arc of swing in a plane at right angles to the shaft 17 being to bring the head 19 beneath either one of the openings 22 or 23.

I do not wish to be limited to the exact mechanism shown, as it is obvious that this principle may be applied in different ways to cameras without departing from the spirit of the invention, and furthermore it is obvious that this device may be applied to other forms of camera than a box camera if desired.

I claim:—

1. The combination with a photographic camera having a front wall, a side wall and a top wall, the front wall having a lens aperture, the top wall and the side wall being formed with view openings, of a pendulum mounted within the camera and having a weighted lower end and having its other end movable in a plane intersecting both of said openings and at right angles to the axis of the lens, and in a plane at right angles to the first named plane, said pendulum when the upper wall of the camera is horizontal or when the side of the camera has been turned to a horizontal position, being observable through one or the other of the openings and being approximately centered with relation thereto.

2. The combination with a box-like body having a side wall and a top wall, there being an opening in the top wall adjacent the side wall of the body and an opening in the side wall, a pendulum mounted within said body and having its lower end weighted and its upper end provided with a head, the pendulum being mounted for swinging movement in a vertical plane intersecting both of said openings and being also mounted for swinging movement in a plane at right angles to the first-named plane, the head of said pendulum when either wall of the body is uppermost and horizontal, being observable through the opening in said horizontal wall and being centered with relation thereto.

In testimony whereof I hereunto affix my signature.

JOHN M. V. FICKLIN.